Patented Mar. 6, 1945

2,370,878

UNITED STATES PATENT OFFICE 2,370,878

PROCESS OF MAKING CHEESE

Zola D. Roundy, Chicago, and Havard L. Keil, Clarendon Hills, Ill., assignors to Armour and Company, Chicago, Ill., a corporation of Illinois No Drawing. Application October 16, 1942, Serial No. 462,307

8 Claims. (Cl. 99—116)

This invention relates to methods of making cheese, and it involves processes in which proteolytic enzymes, particularly tryptic enzymes are employed to hasten the development of cheese body characteristics.

This application is a continuation in part of our copending application Serial No. 275,554, filed May 24, 1939, which is now abandoned.

In the usual way of making cheese, milk is treated with lactic acid bacteria after which rennin is added to bring about coagulation of the casein, and the curd thus formed is cut, cooked, and wheyed off. The resulting product is hooped, pressed, paraffined and stored for varying lengths of time during which the cheese takes on certain body and flavor characteristics customarily associated with aged cheese. Ordinarily several months are required to give the cheese the body and flavor which is desired. Frequently cheese which has aged for long periods and which is known in the trade as "long-held" cheese is blended with cheese which has been aged for shorter periods of time and known as "short-held" cheese, to form a blended or process cheese having desirable characteristics. Wherever the making of long held or aged cheese has been involved, there has customarily been inconvenience and expense because of the delay in manufacture, the necessity of packaging during storage, trimming losses, etc.

Cheese makers have long sought for a way to speed up the formation of body and flavor characteristics without injuring the cheese in other ways and without giving it any undesirable flavors, but previously no satisfactory way had been found. We have therefore set ourselves to this problem and attempted to find some satisfactory solution.

We have discovered that a cheese having excellent quality with body characteristics which have been associated with fully aged cheese can be prepared by the use of tryptic enzymes for directly attacking the curd when the action of these enzymes is stopped by the application of heat after a relatively very short aging period.

By "body characteristics" we refer to the consistency, firmness or substance of the cheese. A well-bodied cheese will feel firm and smooth as distinguished from "pasty," "mealy," "crumbly," etc., these evidences of body being well known to the cheesemaking trade. Body characteristics can be identified by melting the curd, and a curd which upon application of heat, and with the usual salt added, will melt to form a smooth free-flowing mass as distinguished from a stringy, ropy, or solid mass, has fully developed body characteristics.

The tryptic enzymes are the proteolytic enzymes of the animal pancreas which are commonly marketed under the name of trypsin and sometimes called pancreatin. The material commonly known as trypsin or pancreatin contains as well as pure trypsin, minor amounts of chymotrypsin, erepsin, and other proteolytic enzymes, and amylopsin and steapsin, the amylopsin being a starch-splitting enzyme and the steapsin being the lypolitic or fat-splitting enzyme of the pancreas. By the term "tryptic enzyme material," as used herein, we mean the material above described, commonly known as trypsin or any such material derived from animal pancreas and containing a proteolytic enzyme. The term "tryptic enzymes" is taken to include the proteolytic enzymes from the animal pancreas.

We are aware that some experiments have been made which involved the use of proteolytic enzymes in cheese making. For example, in United States Patent No. 1,704,458 proteolytic enzymes are used to obtain hydrolyzed protein products which are then sterilized and added to milk to be made into cheese, providing thereby a suitable medium for growing desired microorganisms. Our process differs from this in a broad way since we employ the enzymes to attack the curd directly and thus produce the desired cheese body.

Our process also differs from the methods described by Wojtkiewicz and Inikkoff (Tenth International Dairy Congress, Rome 1934, and Le Lait, April 1935), and the processes described by the Pennsylvania State College School of Agriculture and Experiment Station, Bulletin No. 362, dated May, 1938, entitled "Rate of ripening in cheddar cheese." The processes set forth in these references will give a cheese product of bitter flavor which objection was clearly noted by the authors.

In the past the principal efforts have been in the direction of adding certain cultures of bacteria or adding certain fungi to give a distinctive flavor or to provide an additional vitamin content. It is well known that bacteria acquire definite and marked selectivities and exhibit otherwise varying behavior depending on the conditions under which they are permitted to grow or act. The prior work in this field has endeavored to standardize the behavior of the organisms by trying to regulate the media upon which they grow. Our process is distinct from this work in that we employ pancreatic enzymes for directly attacking the curd and it has the great advantage that results can be controlled accurately and the anomalies of bacterial organism behavior are largely avoided.

In our process the tryptic enzyme material is preferably added directly to the milk which is to be made into cheese, and the enzymes immediately become effective for attacking the milk protein. Coagulation is effected by the addition of a suitable agent such as rennin to form whey and curd and the added tryptic enzymes proceed to act on the curd, changing the proteins contained in it. But the enzymes must not be allowed to act to the conclusion of their natural operation as previously supposed. Instead we follow within a period of a few hours to a few days, depending on specific conditions as hereinafter explained, with a heating operation which permanently stops the action of the tryptic enzymes and yields a cheese product of good flavor having body characteristics comparable with the best blended process cheeses made from long-held cheese.

Instead of adding the tryptic enzyme material to the milk before coagulation it might conceivably be added to the curd after coagulation, but the mechanical difficulties involved in admixing the material after the curd has formed make it preferable to add this material prior to or at the time of coagulation. For convenience of explanation we use the term "milk" to include the material acted upon through the treatment steps up to the point of coagulation and use the term "milk material" to designate the material acted upon from the beginning of the process through coagulation to the stage where curd body development is completed.

We find that the tryptic enzyme material is especially effective in producing the desired protein alteration for forming good body characteristics, much more effective than proteolytic enzyme material from other sources. For this purpose pepsin, for example, will not suffice in this function but in our process pepsin may serve another very important function, so the combined use of tryptic enzymes and a pepsin material yields further improved results. Consequently the combined use of the tryptic enzyme material with a pepsin material forms an additional phase of our invention. The pepsin material is derived from animal stomachs and contains the enzyme pepsin.

Still a further phase of the invention involves the use of an erepsin material along with the tryptic enzyme material or along with the tryptic and pepsin materials. The erepsin material sometimes called erepsin or duodenum is derived from the animal duodenum and contains principally the enzyme erepsin. We find that the use of this erepsin material along with the tryptic material, or along with the tryptic and pepsin materials, gives further improved results. It is believed that the pepsin and erepsin act in different ways when combined with the action of trypsin since the erepsin is thought to carry on digestion of intermediate products which have been incompletely acted upon by trypsin and thus acts where trypsin is less effective, while pepsin seems to act along with trypsin to prevent the occurrence of a slightly off flavor which the tryptic material is inclined to produce when it operates alone to yield proper body prior to the heating step. This slightly off flavor may best be described by the term "slight rancidity" and must not be confused with the bitterness resulting when a trypsin material is left to act to completion.

Also, when pepsin is employed with the tryptic enzymes somewhat better control can be effected than in the case of tryptic enzymes alone. The amount of the pepsin material which can be used is subject to much greater variation than the amount of tryptic material, and it seems that the combined action of the enzymes contained in these materials permits wider latitude of conditions than if the trypsin material alone is used. In other words, when both the tryptic and pepsin materials are used the results can be controlled somewhat more accurately. When the pepsin material is used with the tryptic material in this process, the amount of the pepsin material may be increased twelvefold without undesirable results, but were the amount of the tryptic material increased threefold the curd would likely be so broken down as to destroy the body. It is possible to use less than 50 c. c. of the tryptic material which tests 1:1.666 U. S. P. trypsin to each 100 pounds of milk and good results may be obtained if only 20 c. c. of such material per 100 pounds of milk is used. Also it may be said that the necessary amount of tryptic material is reduced if the erepsin material is used to take care of some of the intermediate protein products.

When the tryptic material alone is used in our process the amount may vary from 20 to 100 c. c. of this material testing 1:1.666 U. S. P. trypsin per one hundred pounds of milk, and if pepsin is also used the amount of the pepsin material may vary from 0.5 gram to 6 grams testing 1:3000 U. S. P. pepsin for each 100 pounds of milk. Thus, counted in terms of the trypsin and pepsin units, the preferred amount to be used is from 33 to 166 U. S. P. units of trypsin per 100 pounds of milk, and if pepsin materials is also used 1500 to 18,000 U. S. P. units of pepsin per 100 pounds of milk.

When the pepsin material is used it is not essential to add rennin since the pepsin is also a coagulating agent and will form a curd. However, the pepsin does not form as desirable a curd as does rennin, and even when we employ pepsin we prefer also to add rennin to effect the coagulation. Of all the known enzymes only rennin and pepsin have qualities which make them useful as coagulants in cheese production, and as used herein the term coagulating agent will include only rennin, pepsin, or a mixture of these.

We have further discovered that instead of the ordinary trypsin or pancreatin it is better to use a tryptic material which is substantially free of steapsin. We have found that by eliminating the steapsin a rancidity in the cheese product is avoided and we therefore emphasize the use of the pancreatin which is substantially free of the steapsin. Normally the common trypsin or pancreatin might be regarded as substantially free of steapsin since so little is naturally included, but by "substantially free" we mean the material used does not even contain a substantial portion of the steapsin normally contained in the common trypsin or pancreatin.

The enzyme materials may be added in any suitable form, that is, in liquid or powder form. When more than one material is used where both tryptic and peptic materials are employed, these ought not to be mixed together prior to their being incorporated in the milk or curd since by the nature of the enzymes the trypsin would tend to destroy the pepsin, but in such cases the materials should be added separately. We have found that satisfactory results may be obtained if each of the enzyme materials is added separately to the milk at approximately the same time. These materials may even be added after the addition of rennin since coagulation is not completed for something like about five minutes, during which time the enzymes can come into contact with the proteins.

As above stated there may be considerable variation in the length of time the proteolytic enzymes may be permitted to act, this period being a few hours only or a much longer time and a factor which has much to do with the length of this period is the temperature at which the curd is kept prior to the heating step. It appears to be true that the activity of these enzymes is greatest at a temperature just below the temperature at which they are destroyed, and that lower temperatures mean decreased enzymatic activity, so that while these enzymes are quite active at a temperature of around 104° F., their activity at 32° F. is quite low. However, the enzymes if not destroyed do continue to act even at extremely low temperatures, and this fact renders our process dependent upon the final heating step. But in carrying out our improved methods, if it is not convenient to process the curd with heat shortly after it has been coagulated, the curd may be stored at low temperatures for several days or even weeks before the final treatment, and during this time the enzymes will not have acted to the extent where a bitter flavor is produced.

It is understood that while advantageous to use the tryptic material which is substantially free of steapsin and to use the pepsin material and also erepsin material in addition to the tryptic material, our invention is not limited to the practice of these features.

In the final or heating step the curd is heated to a temperature sufficiently high to destroy the added enzyme materials, and such temperature will generally be not less than 130° F. Usually we heat the curd to about 150° or 160° F. since the higher temperature makes the cheese more fluid and easier to pour from the heating vessel. If desired, the temperature may be carried to 175° F. or even higher without damage to the cheese. We have found, however, that if the temperature of the curd is carried to not less than 130° F. that the activity of the added proteolytic enzymes is substantially destroyed. In our customary practice of this part of the process we add an ordinary emulsifier such as sodium citrate, heat the curd in a suitable vessel to about 150° or 160° F., and then after the addition of salt and other desired condiments pour the molten cheese into suitable containers or packages and allow to cool. Conveniently, other prepared cheeses may be melted with the cheese prepared by this improved process, this other cheese being melted and blended in at this heating step. Thus our process lends itself very effectively to blending with other cheeses.

Specific examples of the practice of the improved processes are as follows:

Example 1

To 1,000 pounds of milk we add 1% of a commercial lactic acid starter and the mixture is ripened as desired. After ripening the milk is brought to about 90° F. and 700 c. c. of a tryptic material testing 1:1.666 U. S. P. trypsin is added for attacking the curd protein. 40 c. c. of a commercial rennet extract is added to produce coagulation. When the milk has attained the proper degree of coagulation as determined in the usual manner it is cut and cooked and the whey drawn off. The curd after draining is placed in a cooler at 35° F. and left for 6 days. It is then withdrawn and heated to a temperature of 150° F., and while still in a molten condition the cheese is flowed into packages.

Example 2

To 270 pounds of milk we add 2% of a commercial lactic acid starter and the mixture is ripened as desired. After ripening the milk is brought to about 90° F. and 200 c. c. of a tryptic material testing 1:1.666 U. S. P. trypsin is added for attacking the curd protein. 27 c. c. of a commercial rennet extract is added to produce coagulation. When the milk has attained the proper degree of coagulation as determined in the usual manner it is cut and cooked and the whey drawn off. The curd after draining is placed in a cooler at 35° F. and left for 4 days. It is then withdrawn and heated to a temperature of 150° F., and while still in a molten condition is flowed into packages.

Example 3

To 200 pounds of milk we add 0.5% of a commercial lactic acid starter and the mixture is ripened as desired. After ripening the milk is brought to about 90° F. and 100 c. c. of a tryptic material testing 1:1.666 U. S. P. trypsin and 1.5 grams of a pepsin material testing 1:3000 U. S. P. pepsin are separately added for attacking the curd protein. 10 c. c. of a commercial rennet extract is added to produce coagulation. When the milk has attained the proper degree of coagulation as determined in the usual manner it is cut and cooked and the whey drawn off. The curd after draining is stored at a temperature of 75° F. for a period of 24 hours. It is then heated to a temperature of 150° F., and while in molten condition flowed into suitable packages.

Example 4

To 400 pounds of milk we add 1% of a commercial lactic acid starter and the mixture is ripened in the usual way. After ripening the milk is brought up to approximately 90° F. and 200 c. c. of a tryptic material testing 1:1.666 U. S. P. trypsin, 3.0 grams of a pepsin material testing 1:3000 U. S. P. pepsin and 200 c. c. of an erepsin liquid material are separately added to the milk to attack the curd protein. 20 c. c. of a commercial rennet extract is added to produce coagulation. When the milk has attained the proper degree of coagulation as determined in the usual manner, it is cut and cooked and the whey drawn off. The curd after draining is held at 75° F. for a period of 2 days (48 hours), after which it is heated to a temperature of 150° F., and while still in molten condition is flowed into suitable packages.

The above given specific examples are intended only as illustrations of ways in which the invention may be practiced and in no way limiting the scope of the invention. It is understood that the details of carrying out the improved process may be varied greatly according to the knowledge of the art without departing from the spirit of the invention. Though in the foregoing explanation certain theories have been given to clarify what is believed to be the nature of the operation of the improved processes we do not wish to be limited to such theories of operation and do not wish to be understood as disclaiming any part of the invention should it later be found that the advantages obtained are more correctly explained by reference to some other scientific theory.

What we claim as new and desire to secure by Letters Patent is:

1. In a process for preparing cheese, the steps of adding to a milk material a tryptic enzyme material to produce the development of body characteristics through tryptic enzyme action, adding a coagulating agent to said milk material while in uncoagulated state to coagulate it and produce a curd, and after body characteristics have been developed and before said enzymes have acted to completion heating said curd to a temperature in excess of 130° F. to destroy said tryptic enzymes.

2. In a process for preparing cheese, the steps of adding to a milk material a tryptic enzyme material and a pepsin material to produce the development of body characteristics through tryptic and peptic enzyme action, adding a coagulating agent to said milk material while in uncoagulated state to coagulate and produce a curd, and after body characteristics have been developed and before said enzymes have acted to completion heating said curd to a temperature in excess of 130° F. to destroy the tryptic and peptic enzymes.

3. In a process for preparing cheese, the steps of adding to a milk material a tryptic enzyme material to produce the development of body characteristics through tryptic enzyme action, adding rennin to said milk material while in uncoagulated state to coagulate it and produce a curd, and after body characteristics have been developed and before said enzymes have acted to completion heating said curd in a temperature in excess of 130° F. to destroy said tryptic enzymes.

4. In a process for preparing cheese, the steps of adding to a milk material a tryptic enzyme material and a peptic enzyme material to produce the development of body characteristics through tryptic and peptic enzyme action, adding rennin to said milk material while in uncoagulated state to coagulate it and produce a curd, and after body characteristics have been developed and before said enzymes have acted to completion heating said curd to a temperature in excess of 130° F. to destroy the tryptic and peptic enzymes.

5. In a process for preparing cheese the steps of adding to a milk material a tryptic material, a peptic material and an ereptic material to produce the development of body characteristics to the action of proteolytic enzymes contained in said added materials, adding rennin to said milk material while in uncoagulated state to coagulate it and produce a curd, and after body characteristics have been developed and before said enzymes have acted to completion heating said curd at a temperature in excess of 130° F. to destroy the proteolytic enzymes contained in said added materials.

6. In a process for preparing cheese, the steps of adding to milk a tryptic enzyme material which is substantially free of steapsin to produce the development of body characteristics through tryptic enzyme reaction, adding a coagulating agent to said milk material while in uncoagulated state to coagulate it and produce a curd, and after body characteristics have been developed and before said enzymes have acted to completion, heating said curd to a temperature in excess of 130° F. to destroy the tryptic enzymes.

7. In a process for preparing cheese, the steps of adding to a milk material a tryptic enzyme material which is substantially free of steapsin and a pepsin material to produce the development of body characteristics through proteolytic enzyme action, adding rennin to said milk material while in uncoagulated state to coagulate it and produce a curd, and after body characteristics have been developed and before said enzymes have acted to completion heating said curd to a temperature in excess of 130° F. to destroy the added proteolytic enzymes.

8. In a cheese making process wherein a tryptic enzyme material is added to the milk material to hasten the development of body characteristics, and wherein curd is produced through coagulation of uncoagulated milk material employed, the step which comprises heating said curd at the conclusion of the development of body characteristics to a temperature of not less than 130° F. to destroy the tryptic enzymes included in said added enzyme material.

ZOLA D. ROUNDY.
HAVARD L. KEIL.